United States Patent Office 3,092,642
Patented June 4, 1963

3,092,642
$\Delta^{8(14),22}$-3-ACETOXY-11-KETO-ERGOSTADIENE AND PROCESS FOR THE PREPARATION THEREOF
Roger J. Tull, Plainfield, and John M. Chemerda, Metuchen, N.J., assignors to Merck & Co., Inc., Rahway, N.J., a corporation of New Jersey
No Drawing. Filed July 29, 1957, Ser. No. 674,597
8 Claims. (Cl. 260—397.2)

This invention is concerned generally with steroid compounds having an oxygen atom attached to the carbon atom in the 11-position of the molecule and with processes for preparing these 11-oxygenated steroid compounds. More particularly, it relates to a novel process for converting epoxides of $\Delta^{7,(8),9(11)}$-cyclopentanopolyhydrophenanthrene compounds to the corresponding $\Delta^{8(9)}$-11-keto-cyclophentanopolyhydrophenanthrene compounds, and to the intermediate compounds thus obtained. The $\Delta^{8(9)}$-11-keto-cyclopentanopolyhydrophenanthrene compounds prepared in accordance with our novel procedure are valuable as intermediates in the synthesis of other sterioid compounds having an oxygen atom attached to the 11-carbon atom, such as the adrenal hormones, corticosterone, cortisone and Compound F.

This application is a continuation-in-part of copending applications Serial No. 262,647, filed December 20, 1951, now abandoned, and Serial No. 621,985, filed November 14, 1956, now abondoned, the latter of which is a division of application Serial No. 263,476, filed December 26, 1951, now Patent No. 2,798,082.

The $\Delta^{8(9)}$-11-keto-cyclopentanopolyhydrophenanthrene compounds, subject of the present invention have at rings B and C the following chemical structure:

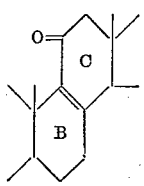

These $\Delta^{8(9)}$ - 11-keto-cyclopentanopolyhydrophenanthrene compounds can be prepared as follows: an epoxide of a $\Delta^{7(8),9(11)}$-cyclopentanopolyhydrophenanthrene compound, that is a $\Delta^7$-9,11-epoxy-cyclopentanopolyhydrophenanthrene compound (Compound 1 hereinbelow), or a $\Delta^{9(11)}$-7,8 - epoxy-cyclopentanopolyhydrophenanthrene compound (Compound 2), is reacted with a hydrogen halide under anhydrous conditions to form the corresponding $\Delta^{8(9)}$-7,11-dihalo-cyclopentanopolyhydrophenanthrene compound (Compound 3); the latter compound is reacted with an aqueous solution of metal salt characterized as having a cation which forms water-insoluble halides and an anion which is non-reactive with steriod compounds, thereby producing the corresponding 11-keto-cyclopentanopolyhydrophenanthrene compound having a double bond connecting the carbon atom in the 8-position with a carbon atom adjacent thereto and gamma with respect to the 11-keto substituent (Compound 4). This compound is then treated with a base to form the corresponding $\Delta^{8(9)}$ - 11-keto-cyclopentanopolyhydrophenanthrene compound (Compound 5).

The reactions indicated hereinabove may be chemically represented, insofar as rings B and C are concerned, as follows:

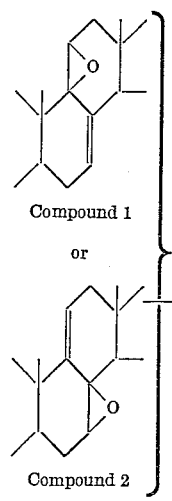

Compound 1
or
Compound 2

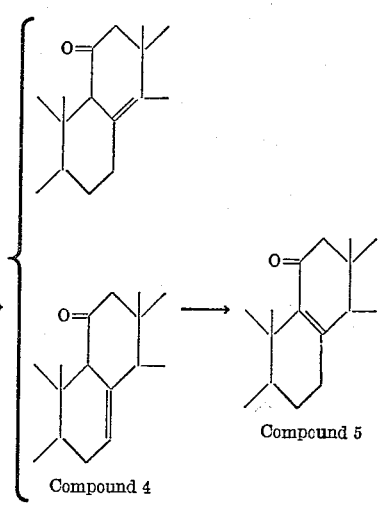

Compound 3

Compound 4

Compound 5 wherein X represents halogen.

The epoxides of $\Delta^{7(8),9(11)}$-cyclopentanopolyhydrophenanthrene compounds which we ordinarily empoly as starting materials in carrying out the presently invented process are those having a sterol side chain attached to the carbon atom in the 17-position of the molecule such as ergosteryl D-acetate epoxide, $\Delta^{7,9(11),22}$-ergostadiene epoxide, $\Delta^{7,9(11)}$-3-acyloxy-ergostadiene epoxide, $\Delta^{7,9(11)}$-cholestene epoxide, $\Delta^{7,9(11)}$-3-acyloxy-cholestene epoxide, $\Delta^{7,9(11)}$-3-acetoxy-cholestene- epoxide, $\Delta^{7,9(11),22}$-3-acyloxy-stigmastadiene epoxide, $\Delta^{7,9(11),22}$-3-acetoxy-stigmastadiene-epoxide, a bile acid side chain attached to the 17-carbon atom such as $\Delta^{7,9(11)}$-3-acyloxy-cholenic acid epoxide, a degraded bile acid side chain attached to the 17-carbon atom such as $\Delta^{7,9(11)}$-3-acyloxy-bisnorallocholenic acid epoxide, $\Delta^{7,9(11)}$-3-acetoxy-bisnorallocholenic acid epoxide, a 17 acetyl substituent such as $\Delta^{7,9(11)}$-3-acyloxy-20-keto-allopregnene epoxide, $\Delta^{7,9(11)}$-3-acetoxy-20-keto-allopregnene epoxide, a sapogenin side chain such as $\Delta^{7,9(11)}$-dehydrotigogenin acylate epoxide, $\Delta^{7,9(11)}$-dehydrotigogenin acetate epoxide, and the like.

In preparing these epoxides of $\Delta^{7,9(11)}$-cyclopentanopolyhydrophenanthrene compounds, utilized as starting materials in our procedure, we ordinarily start with the corresponding $\Delta^{7,9(11)}$ - cyclopentanopolyhydrophenanthrene compound, certain of which, such as ergosterol D and 3-acyloxy derivatives thereof are described in the prior art. Other $\Delta^{7,9(11)}$-cyclopentanopolyhydrophenanthrene compounds can be prepared, starting with readily-available $\Delta^5$-cyclopentanopolyhydrophenanthrene compounds such as cholesterol, by treating said $\Delta^5$-cyclopentanopolyhydrophenanthrene compound (Compound 6 hereinbelow) with N-bromosuccinimide, reacting the resulting $\Delta^5$-7-bromo-cyclopentanopolyhydrophenanthrene compound (Compound 7) with a tertiary amine to form the corresponding Δ5,7-cyclopentanopolyhydrophenantherene compound (Compound 8), reacting this compound with hydrogen in the presence of Raney nickel catalyst thereby selectively reducing the unsaturated linkage attached to the carbon atom in the 5-position to form the corresponding Δ7-cyclopentanopolyhydrophenanthrene compound (Compound 9) and bringing said Δ7-cyclopentanopolyhydrophenanthrene compound into intimate contact with a solution of mercuric acetate in acetic acid thereby producing the corresponding Δ7,9(11)-cyclopentanopolyhydrophenanthrene compound (Compound 10). The reactions indicated hereinabove may be chemically represented (insofar as rings B and C are concerned) as follows:

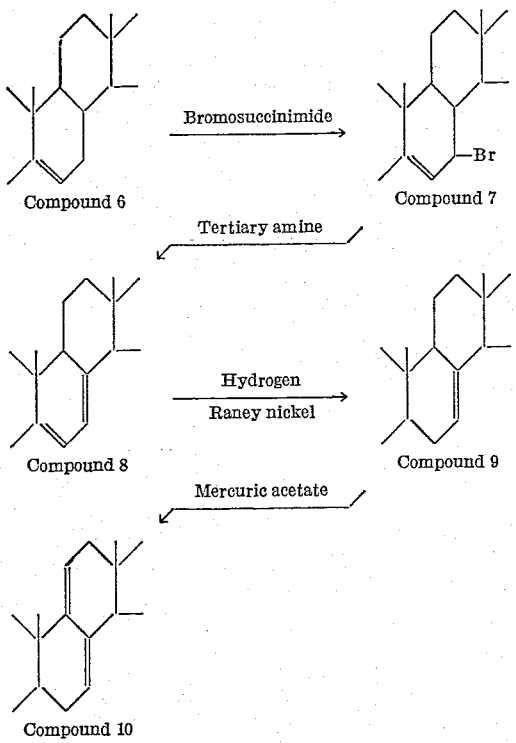

The Δ7,9(11)-cyclopentanopolyhydrophenanthrene compound thus obtained is then converted to the corresponding epoxide by reaction with perbenzoic acid thus forming the corresponding Δ7-9,11-epoxy-cyclopentanopolyhydrophenanthrene compound (Compound 1 hereinbelow) or the corresponding Δ9(11)-7,8-epoxy-cyclopentanopolyhydrophenanthrene (Compound 2). This reaction may be chemically represented (with respect to the chemical changes occurring in rings B and C) as follows:

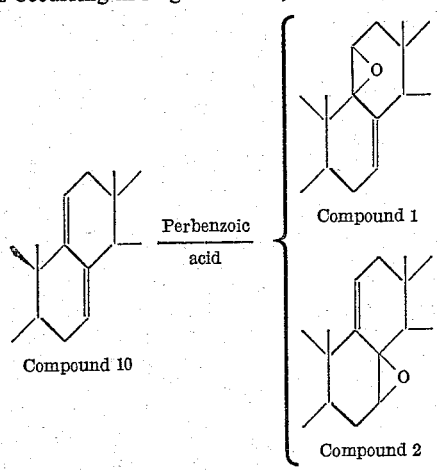

In carrying out our novel process, the epoxide of the Δ7,9(11)-cyclopentanopolyhydrophenanthrene compound, utilized as starting material therein, is reacted with a hydrogen halide such as hydrogen chloride, hydrogen bromide, and the like, under anhydrous conditions, to produce the corresponding Δ8(9)-7,11-dihalo-cyclopentanopolyhydrophenanthrene compound. The reaction between the epoxide of the Δ7,9(11)-cyclopentanopolyhydrophenanthrene starting material and the hydrogen halide is ordinarily conducted by bringing the reactants together in a liquid medium inert under the reaction conditions, as, for example, in a hydrocarbon solvent such as benzene or toluene, in an ethereal solvent such as diethyl ether, in a chlorinated hydrocarbon solvent such as chloroform, in a ketone such as acetone and the like. As to the hydrogen halide, it is ordinarily preferred to utilize dry hydrogen chloride, and to conduct the reaction utilizing cold chloroform as the reaction solvent. An excess of hydrogen halide is preferably used in order to insure complete formation of the dihalo compound. The reaction is preferably carried out in the cold (i.e., at a temperature of about 0° C.), but temperatures up to about 25° C. can be employed, if desired.

The reaction between the epoxide of the Δ7,9(11)-cyclopentanopolyhydrophenanthrene compound and the hydrogen halide results in the formation of the corresponding Δ8(9)-7,11-dihalo-cyclopentanopolyhydrophenanthrene compound such as: Δ8(9),22-7,11-dihalo-ergostadiene, Δ8(9),22-3-acyloxy-7,11-dihalo-ergostadiene, Δ8(9),22-3-acetoxy-7,11-dichloro-ergostadiene, Δ8(9)-7,11-dihalo-cholestene, Δ8(9)-3-acyloxy-7,11-dihalocholstene, Δ8(9)-3-acetoxy-7,11-dichloro-cholestene, Δ8(9),22-3-acyloxy-7,11-dihalo-stigmastadiene, Δ8(9),22-3-acetoxy-7,11-dichloro-stigmastadiene, Δ8(9)-3-acyloxy-7,11-dihalo-cholenic acid, Δ8(9)-3-acetoxy-7,11-dichloro-cholenic acid, Δ8(9)-3-acyloxy-7,11-dihalo-bisnorallocholenic acid, Δ8(9)-3-acetoxy-7,11-dichloro-bisnorallocholenic acid, Δ8(9)-3-acyloxy-7,11-dihalo-20-keto-allopregnene, Δ8(9)-3-acetoxy-7,11-dichloro-20-keto-allopregene, Δ8(9)-7,11-dihalo-dehydrotigogenin acylate, Δ8(9)-7,11-dichloro-dehydrotigogenin acetate, and the like.

The Δ8(9)-7,11-dihalo-cyclopentanopolyhydrophenanthrene compound is then reacted with an aqueous solution of a metal salt, characterized as having a cation which forms water-insoluble halides and an anion which is non-reactive with the steroid compound, such as aqueous silver nitrate, aqueous silver oxide, aqueous mercurous nitrate, and the like, thereby forming the corresponding 11-keto-cyclopentanopolyhydrophenanthrene compound having a double bond connecting the carbon atom in the 8-position with a carbon atom adjacent thereto and gamma with respect to the 11-keto substituent. In conducting this reaction, the Δ8(9)-7,11-dihalo-cyclopentanopolyhydrophenanthrene compound is ordinarily dissolved in a water-miscible organic solvent such as acetone, and the resulting solution is mixed with an aqueous solution of the metal salt, whereupon an immediate reaction takes place as is evidenced by the copious precipitation of the metal halide. The resulting mixture is then diluted with an additional quantity of the water-miscible organic solvent and the resulting mixture is allowed to remain at room temperature for about two hours in order to insure completion of the reaction. The precipitated metal halide is separated from the reaction mixture by filtration, and the β,γ-unsaturated-11-keto-cyclopentanopolyhydrophenanthrene compound formed in the reaction is recovered from the filtered reaction solution. This is conveniently effected by diluting this solution with water, whereupon said β,γ-unsaturated-11-keto-cyclopentanopolyhydrophenanthrene compound precipitates and is recovered by filtration.

The 11-keto-cyclopentanopolyhydrophenanthrene compounds, obtained with the foregoing procedure are β,γ-unsaturated with respect to the 11-keto substituent (that is they have a double bond connecting the 8-carbon atom with a carbon atom adjacent thereto and gamma with respect to the 11-keto substituent), and include Δ7(8),22-11- keto-ergostadiene, $\Delta^{8(14),22}$-11-keto-ergostadiene, $\Delta^{7(8),22}$-3-acyloxy-11-keto-ergostadiene, $\Delta^{8(14),22}$-3-acyloxy-11-keto-ergostadiene, $\Delta^{7(8),22}$-3-actoxy-11-keto-ergostadiene, $\Delta^{8(14),22}$ - 3-acetoxy-11-keto-ergostadiene, $\Delta^{7(8)}$-11-keto-cholestene, $\Delta^{8(14)}$-11-keto-cholestene, $\Delta^{7(8)}$-3-acyloxy-11-keto-cholestene, $\Delta^{8(14)}$-3-acyloxy-11-keto-cholestene, $\Delta^{7(8)}$ - 3-acetoxy-11-keto-cholestene, $\Delta^{8(14)}$-3-acetoxy-11-keto-cholestene, $\Delta^{7(8),22}$-3-acyloxy-11-keto-stigmastadiene, $\Delta^{8(14),22}$-3-acyloxy-11-keto-stigmastadiene, $\Delta^{7(8),22}$-3-acetoxy-11-keto-stigmastadiene, $\Delta^{8(14),22}$-3-acetoxy-11-keto-stigmastadiene, $\Delta^{7(8)}$-3-acyloxy-11-keto-cholenic acid, $\Delta^{7(8)}$-3-acetoxy-11-keto-cholenic acid, $\Delta^{8(14)}$-3-acyloxy-11-keto-cholenic acid, $\Delta^{8(14)}$-3-acetoxy-11-keto-cholenic acid, $\Delta^{7(8)}$ - 3 - acyloxy-11-keto-bisnorallocholenic-acid, $\Delta^{8(14)}$-3-acyloxy-11-keto-bisnorallocholenic acid, $\Delta^{7(8)}$-3-acetoxy-11-keto-bisnorallocholenic acid, $\Delta^{8(14)}$-3-acetoxy-11-keto-bisnorallocholenic acid, $\Delta^{7(8)}$-3-acyloxy-11,20-diketo-allopregnene, $\Delta^{8(14)}$-3-acyloxy-11,20-diketo-allopregnene, $\Delta^{7(8)}$-3-acetoxy-11,20-diketo-allopregnene, $\Delta^{8(14)}$-3-acetoxy-11,20-diketo-allopregnene, $\Delta^{7(8)}$-11-keto-dehydrotigogenin-acylate, $\Delta^{8(14)}$-11-keto-dehydrotigogenin-acylate, $\Delta^{7(8)}$ - 11 - keto - dehydrotigogenic-acetate, $\Delta^{8(14)}$-11-keto-dehydrotigogenin-acetate, and the like.

These $\beta,\gamma$-unsaturated-11-keto-cyclopentanopolyhydrophenanthrene compounds are then converted to the desired $\Delta^{8(9)}$-11-keto-cyclopentanopolyhydrophenanthrene compound by treating the former with a base such as an alkali metal hydroxide, an alkaline earth metal hydroxide, ammonium hydroxide, an equeous solution of an organic base such as pyridine, and the like. It is ordinarily preferred to dissolve the alkali metal hydroxide and the $\beta,\gamma$-unsaturated - 11-keto-cyclopentanopolyhydrophenanthrene compound in alcohol, and to allow the resulting alcoholic solution to stand at room temperature for an extended period of time, whereupon the $\beta,\gamma$-unsaturated linkage connecting the 8-carbon atom and the carbon atom in the 7 or 14 position rearranges to join the carbon atoms in the 8 and 9-positions. There is thus obtained the desired $\Delta^{8(9)}$ - 11-keto-cyclopentanopolyhydrophenanthrene compound such as $\Delta^{8(9),22}$-11-keto-ergostadiene, $\Delta^{8(9),22}$-3-hydroxy-11-keto-ergostadiene, $\Delta^{8(9),22}$-3-hydroxy-11-keto-stigmastadiene, $\Delta^{8(9)}$-3-hydroxy-11-keto-cholenic acid, $\Delta^{8(9)}$-3-hydroxy-11,20-diketo-allopregnene, $\Delta^{8(9)}$-11-keto-dehydrotigogenin, and the like.

The following examples illustrate methods of carrying out the present invention, but it is to be understood that these examples are given for purposes of illustration and not of limitation.

Example 1

One-half gram of ergosteryl D-acetate epoxide (i.e., the epoxide of $\Delta^{7,9(11),22}$-3-acetoxy-ergostatriene) was dissolved in 25 cc. of chloroform, the solution was cooled to about 0° C., and dry hydrogen chloride was bubbled through the solution for a period of approximately 30 minutes. The reaction solution was distilled under reduced pressure thereby removing the excess hydrogen chloride and chloroform, and the residual oil was crystallized from petroleum ether. The crystalline material was recovered by filtration, washed with petroleum ether and dried to give substantially pure $\Delta^{8(9),22}$-3-acetoxy-7,11-dichloro-ergostadiene; M.P. 125–130° C., dec. *Analysis.*—Calc'd for $C_{30}H_{46}Cl_2O_2$: C, 70.75; H, 9.12; Cl, 13.91. Found: C, 70.33; H, 9.18; Cl, 13.96.

Example 2

Two-tenths of a gram of $\Delta^{8(9),22}$-3-acetoxy-7,11-dichloro-ergostadiene was dissolved in 20 cc. of acetone, and to the solution was added, with stirring, 10 cc. of a 0.1 N aqueous solution of silver nitrate. An immediated reaction took place accompanied by copious precipitation of silver chloride. The reaction mixture was diluted with an additional 20 cc. of acetone, and the resulting mixture was allowed to stand at room temperature for a period of about 2 hours. The reaction slurry was then filtered, thereby removing the silver chloride, and the insoluble material was washed with acetone. Several volumes of water were added to the filtered solution, whereupon a crystalline production precipitated. This crystalline product was recovered by filtration, washed with water and dried to give crude $\Delta^{22}$-3-acetoxy-11-keto ergostadiene having a double bond connecting the 8-carbon atom with the carbon atom in the 7- or 14-position of the molecule.

The crude material was purified by slurrying with a mixture of ethyl acetate and petroleum ether, whereupon substantially all of the product dissolved; the resulting solution was the filtered and the filtered solution was evaporated to dryness; the residual material was recrystallized from ether, and then from methanol to give substantially pure $\Delta^{22}$-3-acetoxy-11-keto-ergostadiene having a double bond connecting the carbon atom in the 8-position with that in the 7- or 14-position of the molecule; M.P. 178–181° C. *Analysis.*—Calc'd for $C_{30}H_{46}O_3$: C, 79.25; H, 10.20. Found: C, 79.17; H, 10.15.

Example 3

Eleven milligrams of the $\Delta^{22}$-3-acetoxy-11-keto-ergostadiene having a double bond connecting the carbon atom in the 8-position with the carbon atom in the 7- or 14-position of the molecule (prepared as described in Example 2 hereinabove) were dissolved in methanol and 50 milligrams of potassium hydroxide was added to the resulting solution. The resulting solution was allowed to stand for about 15 hours at a temperature of about 25° C. The reaction solution was then worked up as follows: The potassium hydroxide was neutralized by addition of acetic acid. Water was added and the methanol was removed by distillation. The water-insoluble precipitate was collected on a filter and recrystallized repeatedly from methanol to give substantially pure $\Delta^{8(9),22}$-3-hydroxy-11-keto-ergostadiene which was identified by spectrophotometric analysis:

$$\lambda^{\text{isooctane}}_{\text{max.}}\ 2560,\ E\%\ 191$$

These $\Delta^{8(9)}$ - 11 - keto-cyclopentanopolyhydrophenanthrene compounds such as $\Delta^{8(9),22}$-3-hydroxy-11-keto-ergostadiene, $\Delta^{8(9),22}$ - 3-hydroxy-11-keto-stigmastadiene, $\Delta^{8(9),22}$-3-hydroxy-11-keto-cholenic acid, $\Delta^{8(9)}$-3-hydroxy-11,20 - diketo - allopregnene, $\Delta^{8(9)}$ -11 - keto-dehydrotigo genin, 3-acetates thereof, and the like, can be reduced with metallic reducing agents, such as lithium in liquid ammonia, or zinc dust in ethanolic hydrochloric acid solution to form the corresponding nuclearly saturated 11-keto-steroid. For example twenty grams of $\Delta^{8(9),22}$-3-hydroxy-11-keto-ergostadiene or its 3-acetate in 150 ml. dry ethyl ether were added with stirring to 2 liters of liquid ammonia. Twelve grams of freshly cut lithium were then added, and the reaction mixture was stirred at reflux temperature for a period of about six hours. One hundred and fifty milliliters of absolute ethanol was added to the reaction mixture over a period of 35 minutes. After all the ethanol had been added, the blue color due to dissolved lithium disappeared. Forty milliliters of water was added to the resulting mixture, and the ammonia was allowed to evaporate overnight through a mercury trap. The residual ethereal layer was separated, washed with water, dried over sodium sulfate, and the ether was evaporated therefrom in vacuo, leaving a crude white solid.

This solid was dissolved in ether, chromatographed over alumina and the alumina adsorbate was eluted, first with ether and then with a solution of 1% methanol in ether. From the ether eluate there was obtained crystalline $\Delta^{22}$-ergostene-$3\beta$-ol-11-one, M.P. 166–168° C., $(\alpha)_D^{25°C.}=+31°$ ($CHCl_3$). Calculated for $C_{28}H_{46}O_2$: Theory: C, 81.2; H, 11.20. Found: C, 81.10; H, 10.91.

The conversion of these nuclearly unsaturated 11-keto-steroids, such as $\Delta^{22}$-ergostene-$3\beta$-ol-11-one to allopregnane-$3\beta$-ol-11,20-dione acetate is disclosed in J.A.C.S. 73, 2396 (May 1951); J.A.C.S. 73, 4052 (August 1951) use the latter compound to prepare allopregnane-3β,17α,21-triol-11,20-dione 21-acetate; the conversion of the last-named compound to cortisone acetate is set forth in Nature 168, page 28 (July 1951).

Various changes and modifications may be made in carrying out the present invention without departing from the spirit and scope thereof. Insofar as these changes and modifications are within the purview of the annexed claims, they are to be considered as part of our invention.

We claim:
1. The process which comprises reacting ergosteryl D-acetate epoxide with an excess of dry hydrogen chloride in chloroform solution at a temperature below about 25° C. to form $\Delta^{8(9),22}$-3-acetoxy-7,11-dichloro-ergostadiene, reacting this compound in solution in acetone with an aqueous solution of silver nitrate to produce a $\Delta^{8,22}$-3-acetoxy-11-keto-ergostadiene compound having a double bond connecting the carbon atom in the 8-position with a carbon atom adjacent thereto and gamma with respect to the 11-keto-substituent, and reacting the latter compound with potassium hydroxide in methanol at approximately room temperature to form $\Delta^{8(9),22}$-3-hydroxy-11-keto ergostadiene.

2. The process which comprises reacting an excess of a hydrogen halide under anhydrous conditions and at a temperature below about 25° C. with an epoxide of a $\Delta^{7(8),9(11)}$-cyclopentanopolyhydrophenanthrene compound having a C–17 side chain selected from the group consisting of sterol side chain, bile acid side chain, degraded bile acid side chain, 17-acetyl side chain, and sapogenin side chain, thereby forming the corresponding $\Delta^{8(9)}$-7,11-dihalo-cyclopentanopolyhydrophenanthrene compound.

3. The process which comprises reacting ergosteryl D-acetate epoxide with an excess of dry hydrogen chloride in chloroform solution at a temperature below about 25° C. to produce $\Delta^{8(9),22}$-3-acetoxy-7,11-dichloro-ergostadiene.

4. The process which comprises reacting a $\Delta^{8(9)}$-7,11-dihalo - cyclopentanopolyhydrophenanthrene compound having a C–17 side chain selected from the group consisting of sterol side chain, bile acid side chain, degraded bile acid side chain, 17-acetyl side chain, and sapogenin side chain in solution in a water-miscible organic solvent with an aqueous solution of a metal salt, characterized as having a cation which forms water-insoluble halides, thereby forming the corresponding 11-keto-cyclopentanopolyhydrophenanthrene compound having a double bond connecting the carbon atom in the 8-position with a carbon atom adjacent thereto and gamma with respect to the 11-keto substituent.

5. The process which comprises reacting $\Delta^{8(9),22}$-3-acetoxy-7,11-dichloro-ergostadiene in solution in acetone with aqueous silver nitrate to produce a $\Delta^{22}$-3-acetoxy-11-keto-ergostadiene compound, having a double bond connecting the carbon atom in the 8-position with a carbon atom adjacent thereto and gamma with respect to the 11-keto substituent.

6. The process which comprises reacting an 11-keto-cyclopentanopolyhydrophenanthrene compound having a C–17 side chain selected from the group consisting of sterol side chain, bile acid side chain, degraded bile acid side chain, 17-acetyl side chain, and sapogenin side chain, and having a double bond connecting the carbon atom in the 8-position with a carbon atom adjacent thereto and gamma with respect to the 11-keto substituent, with a base at approximately room temperature to form the corresponding $\Delta^{8(9)}$-11-keto-cyclopentanopolyhydrophenanthrene compound.

7. The process which comprises reacting a $\Delta^{22}$-3-acetoxy-11-keto-ergostadiene having a double bond connecting the carbon atom in the 8-position with a carbon atom adjacent thereto and gamma with respect to the 11-keto substituent, with potassium hydroxide in methanol at approximately room temperature to produce $\Delta^{8(9),22}$-3-hydroxy-11-keto-ergostadiene.

8. $\Delta^{8(14),22}$-3-acetoxy-11-keto-ergostadiene.

References Cited in the file of this patent
UNITED STATES PATENTS

| | | |
|---|---|---|
| 2,802,014 | Laubach et al. | Aug. 6, 1957 |
| 2,837,515 | Chemerda et al. | June 3, 1958 |

FOREIGN PATENTS

| | | |
|---|---|---|
| 741,061 | Great Britain | Nov. 23, 1955 |